US009138640B2

United States Patent
Baum et al.

(10) Patent No.: US 9,138,640 B2
(45) Date of Patent: Sep. 22, 2015

(54) ELECTRONIC DEVICE GAMING SYSTEM

(76) Inventors: David Baum, Provo, UT (US); Reed Quinn, Highland, UT (US)

( * ) Notice: Subject to any disclaimer, the term of this patent is extended or adjusted under 35 U.S.C. 154(b) by 492 days.

(21) Appl. No.: 13/600,082

(22) Filed: Aug. 30, 2012

(65) Prior Publication Data

US 2013/0109476 A1    May 2, 2013

Related U.S. Application Data

(60) Provisional application No. 61/551,905, filed on Oct. 26, 2011.

(51) Int. Cl.
| | |
|---|---|
| *A63F 9/24* | (2006.01) |
| *A63F 13/00* | (2014.01) |
| *A63F 13/98* | (2014.01) |
| *A63F 13/24* | (2014.01) |
| *A63F 13/92* | (2014.01) |
| *A63F 13/20* | (2014.01) |
| *A63F 13/90* | (2014.01) |

(52) U.S. Cl.
CPC ............... *A63F 13/02* (2013.01); *A63F 13/06* (2013.01); *A63F 13/24* (2014.09); *A63F 13/92* (2014.09); *A63F 13/90* (2014.09); *A63F 13/98* (2014.09); *A63F 2300/1031* (2013.01); *A63F 2300/1043* (2013.01); *A63F 2300/204* (2013.01)

(58) Field of Classification Search
CPC ..... H04M 1/202; H04M 1/235; H04M 1/254; H04M 1/279; H04M 1/72544; G06F 1/1624; G06F 1/1632
See application file for complete search history.

(56) References Cited

U.S. PATENT DOCUMENTS

| | | | | |
|---|---|---|---|---|
| 6,530,838 | B2 * | 3/2003 | Ha et al. ........................... | 463/36 |
| 6,786,826 | B2 * | 9/2004 | Himoto et al. .................. | 463/43 |
| D500,319 | S * | 12/2004 | Wada ........................... | D14/401 |
| D527,005 | S * | 8/2006 | Navarrez et al. ............. | D14/401 |
| D544,481 | S * | 6/2007 | Maddox et al. ............... | D14/401 |
| 7,316,618 | B2 * | 1/2008 | Hsu ................................. | 463/37 |
| 7,580,728 | B2 * | 8/2009 | Vance et al. ............... | 455/556.1 |
| D602,096 | S * | 10/2009 | Ashida et al. ................ | D21/333 |
| 7,653,771 | B2 * | 1/2010 | Liberty ......................... | 710/303 |
| D615,131 | S * | 5/2010 | Biheller ....................... | D21/333 |
| 8,634,873 | B2 * | 1/2014 | Jones et al. ................... | 455/557 |

(Continued)

FOREIGN PATENT DOCUMENTS

| | | |
|---|---|---|
| JP | 2009-267490 | 11/2009 |
| KR | 20-2010-0013067 | 12/2010 |
| KR | 10-2011-0017669 | 2/2011 |

OTHER PUBLICATIONS

"iControlPad dumps Dock Connector for Bluetooth over Apple Legal Fears; Android BT Confirmed", by Chris Davies, published Sep. 28, 2010. Source http://www.slashgear.com/icontrolpad-dumps-dock-connector-for-bluetooth-over-apple-legal-fears-android-bt-confirmed-28104830/.*

(Continued)

*Primary Examiner* — Steven J Hylinkski
(74) *Attorney, Agent, or Firm* — Superior IP, PLLC; Dustin L. Call

(57) ABSTRACT

One example embodiment includes an electronic device gaming system. The electronic device gaming system includes a case configured to receive an electronic device. The electronic device gaming system also includes an input device. The input device is releasably attached to the case and configured to connect electronically to the electronic device.

19 Claims, 9 Drawing Sheets

(56) References Cited

U.S. PATENT DOCUMENTS

| | | | |
|---|---|---|---|
| D720,342 S * | 12/2014 | Starrett et al. | D14/252 |
| 2002/0082042 A1* | 6/2002 | Mark et al. | 455/550 |
| 2002/0151282 A1* | 10/2002 | Wang | 455/90 |
| 2002/0167491 A1* | 11/2002 | Huang et al. | 345/161 |
| 2003/0073462 A1* | 4/2003 | Zatloukal et al. | 455/558 |
| 2004/0137983 A1* | 7/2004 | Kerr et al. | 463/29 |
| 2004/0195305 A1* | 10/2004 | Dotson | 235/145 R |
| 2005/0078086 A1* | 4/2005 | Grams et al. | 345/158 |
| 2006/0252537 A1* | 11/2006 | Wu | 463/36 |
| 2008/0096620 A1 | 4/2008 | Lee et al. | |
| 2008/0274776 A1* | 11/2008 | Cho et al. | 455/575.4 |
| 2009/0111508 A1* | 4/2009 | Yeh et al. | 455/552.1 |
| 2010/0081505 A1* | 4/2010 | Alten et al. | 463/36 |
| 2010/0110010 A1* | 5/2010 | Choi | 345/169 |
| 2010/0277415 A1* | 11/2010 | Shanmugam et al. | 345/169 |
| 2011/0230178 A1 | 9/2011 | Jones et al. | |
| 2011/0260969 A1* | 10/2011 | Workman | 345/161 |
| 2012/0091313 A1* | 4/2012 | Cohn | 248/682 |
| 2012/0108335 A1* | 5/2012 | Liotta et al. | 463/36 |
| 2012/0189156 A1* | 7/2012 | Leung | 381/387 |
| 2013/0183899 A1* | 7/2013 | Gorsev | 455/41.1 |

OTHER PUBLICATIONS

"iControlPad for iPhone in production; release imminent", by Chris Davies, published Feb. 25, 2010. Source http://www.slashgear.com/icontrolpad-for-iphone-in-production-release-imminent-2575572/.*

"iControlPad for iPhone production parts now shipping [Updated]", by Chris Davies, published Aug. 23, 2010. Source http://www.slashgear.com/icontrolpad-for-iphone-production-parts-now-shipping-2398553/.*

"iControlPad makes playing games on your iPhone easier", by Emily Price, published Aug. 26, 2008. Source http://www.slashgear.com/icontrolpad-makes-playing-games-on-your-iphone-easier-2614653/.*

"iControlPad Pre-Orders Begin at $74.99", by Eli Hodapp, published Feb. 9, 2011. Source http://toucharcade.com/sdlink/.*

"iControlPad turns smartphones into personal gaming devices", by Paul Ridden, published Nov. 2, 2011. Source http://www.gizmag.com/plants-vs-zombies-2-review/28358/.*

"Ion iCade Arcade Cabinet Review", by Zach Honig, published May 31, 2011. Source http://www.engadget.com/2011/05/31/ion-icade-arcade-cabinet-review/.*

International Search Report and Written Opinion of the International Searching Authority (for a PCT application containing the same claims as the current application).

* cited by examiner

ELECTRONIC DEVICE GAMING SYSTEM

CROSS-REFERENCE TO RELATED APPLICATIONS

This application claims the benefit of and priority to U.S. Provisional Patent Application Ser. No. 61/551,905 filed on Oct. 26, 2011, which application is incorporated herein by reference in its entirety.

This application is related to co-pending U.S. application Ser. No. 13/600,091, filed on Aug. 30, 2012, and entitled, "ELECTRONIC COMMUNICATION BETWEEN A GAMEPAD AND AN ELECTRONIC DEVICE", which application is incorporated herein by reference in its entirety.

BACKGROUND OF THE INVENTION

Conventional game systems use a specified hardware configuration in a console with controls that are attached either through a wired connection or wirelessly to the console. The console is then connected to a display (if the console does not include a display) and the user uses the controls to perform desired actions within a game. The game is sold separately and loaded into the console when game play is desired.

However, the game console is rarely adaptable. For example, the hardware is normally selected and manufactured for several years before new gaming consoles are released. That means that users are often using outdated technology, preventing the user from getting the maximum experience from the game.

In addition, the game console is not portable. I.e., in order to get the desired hardware, the consoles are made of a size and design such that the hardware is wired to the display. This means that the console is usually left in one location and other uses must plan around the console location. For example, if the console is connected to a television, then no one else can use that particular television when the console is in use.

In addition, games for these consoles tend to be expensive. I.e., because they are specialized for specific hardware and because they are subject to specific distribution channels, the cost of the games tends to be higher than other types of games. This means that users need to factor in the cost of the games in addition to the cost of the console.

Because of these limitations, users are increasingly turning to mobile devices for gaming. For example, users can download and install games on an iPhone, a tablet, an Android phone or other similar device with little hassle and for much lower prices than console games. In addition, this is hardware that users tend to own and upgrade on a regular basis anyway, so it does not factor into the cost of the gaming experience.

However, gaming on mobile devices has its own drawbacks. For example, many of these devices use a touchscreen. This means that the screen is used as the controller as well as the display. Often, the user's fingers can get in the way of information on the display, making it more difficult to view all of the information available to the user.

In addition, touchscreens do not allow for the precision control that a controller offers. I.e., controllers can allow for a specific input with a specific result. If the user is trying to use a button array on a touchscreen instead, they are more likely to make mistakes.

Accordingly, there is a need in the art for a system that allows a user to play a game on desired hardware. Additionally, there is a need in the art for the system to allow the user to have precise control. Moreover, there is a need in the art for the controls to not use display area for the control.

BRIEF SUMMARY OF SOME EXAMPLE EMBODIMENTS

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

One example embodiment includes an electronic device gaming system. The electronic device gaming system includes a case configured to receive an electronic device. The electronic device gaming system also includes an input device. The input device is releasably attached to the case and configured to connect electronically to the electronic device.

Another example embodiment includes an electronic device gaming system. The electronic device gaming system includes a case configured to receive an electronic device. The electronic device gaming system also includes a shelf releasably attached to the case. The electronic device gaming system further includes a gamepad. The gamepad is slidably attached to the shelf. The gamepad is also configured to connect wirelessly to the electronic device. The gamepad further includes one or more controls.

Another example embodiment includes an electronic device gaming system. The electronic device gaming system includes a case configured to receive an electronic device. The case includes a channel and a lip protruding into the channel. The electronic device gaming system also includes a shelf. The shelf includes a protrusion, wherein the protrusion is configured to be placed in the channel and slid over the lip, releasably attaching the shelf to the case. The electronic device gaming system further includes a gamepad. The gamepad is slidably attached to the shelf. The gamepad is also configured to connect wirelessly to the electronic device. The gamepad further includes one or more controls.

These and other objects and features of the present invention will become more fully apparent from the following description and appended claims, or may be learned by the practice of the invention as set forth hereinafter.

BRIEF DESCRIPTION OF THE DRAWINGS

To further clarify various aspects of some example embodiments of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION OF SOME EXAMPLE EMBODIMENTS

Reference will now be made to the figures wherein like structures will be provided with like reference designations. It is understood that the figures are diagrammatic and schematic representations of some embodiments of the invention, and are not limiting of the present invention, nor are they necessarily drawn to scale.

Figure 1A:
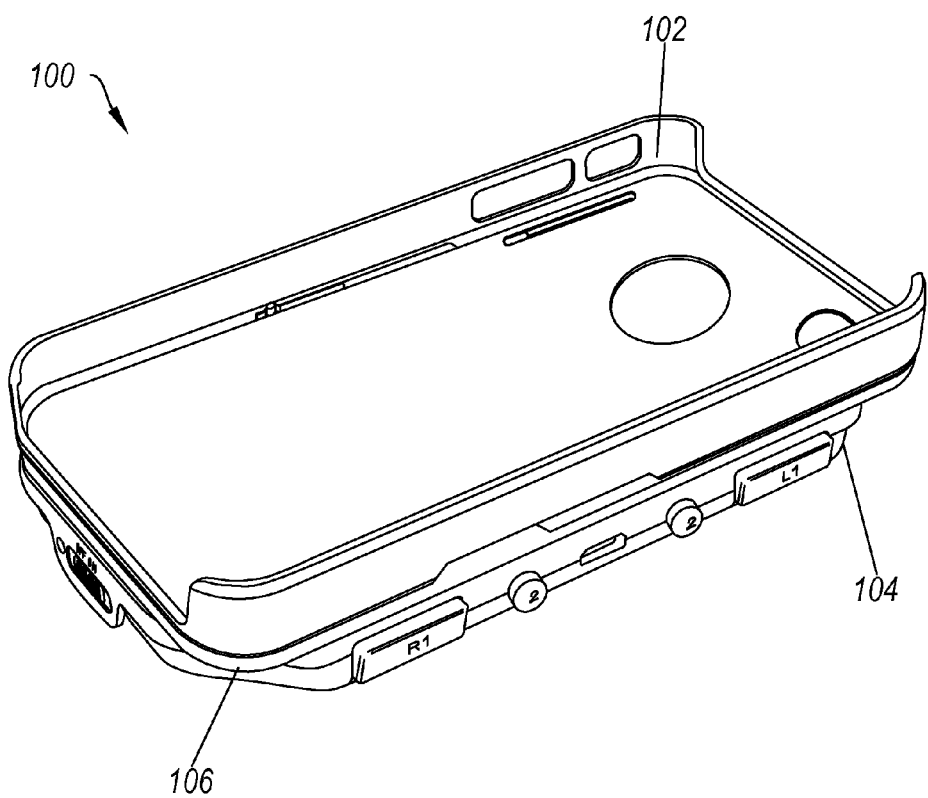
FIG. 1A illustrates a top perspective view of an example of an electronic device gaming system.
Figure 1B:
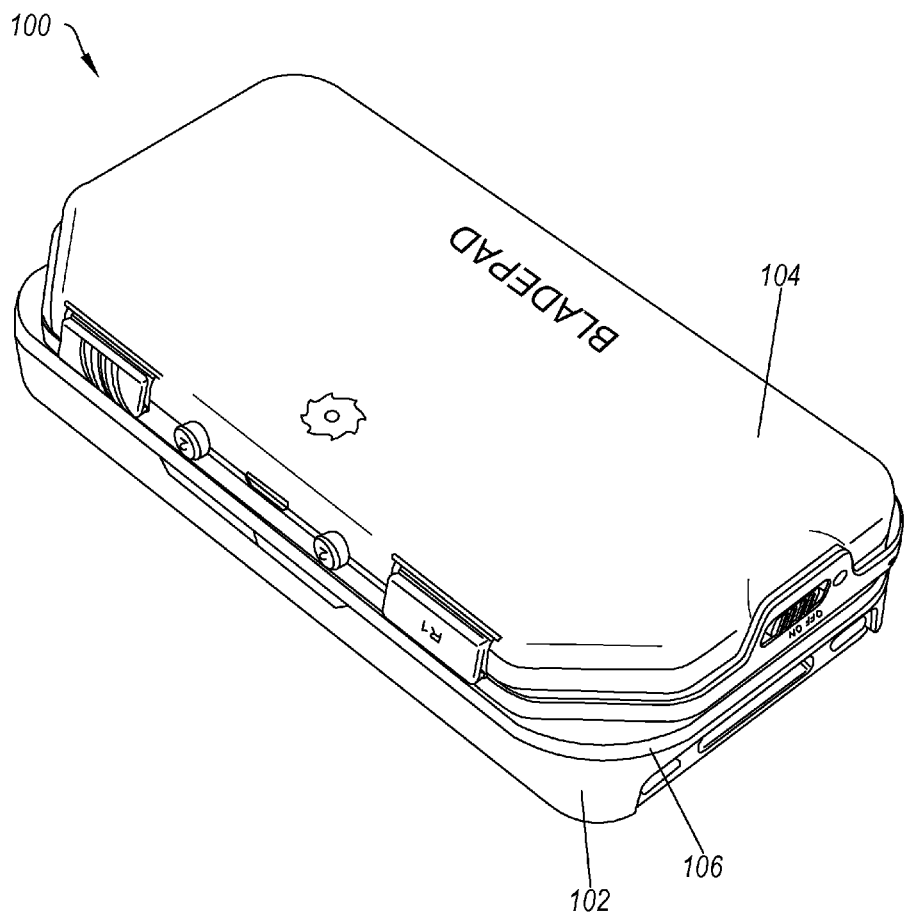
FIG. 1B illustrates a bottom perspective view of the example of an electronic device gaming system.
Figure 1C:
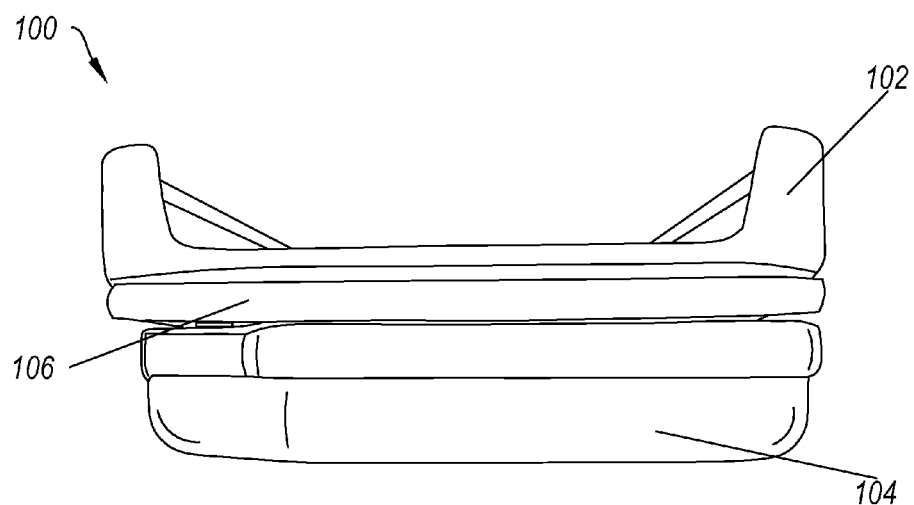
FIG. 1C illustrates a side view of the example of an electronic device gaming system.

FIGS. 1A, 1B and 1C illustrate an example of an electronic device gaming system 100. FIG. 1A illustrates a top perspective view of the example of an electronic device gaming system 100; FIG. 1B illustrates a bottom perspective view of the example of an electronic device gaming system 100; and FIG. 1C illustrates a side view of the example of an electronic device gaming system 100. In at least one implementation, the electronic device gaming system 100 can protect an enclosed electronic device. Additionally or alternatively, the electronic device gaming system 100 can include a controller, as described below.

FIGS. 1A, 1B and 1C show that the electronic device gaming system 100 can include a case 102. In at least one implementation, the case 102 can be configured to protect the electronic device. I.e., the case 102 can be configured to receive the electronic device and provide some measure of protection for the electronic device. For example, the case 102 can include a shock resistant material that is configured to absorb the shock of an impact delivered to the electronic device.

FIGS. 1A, 1B and 1C also show that the electronic device gaming system 100 can include a input device 104 attached to the case 102. In at least one implementation, the input device 104 can include any device which allows a user to input a command for an electronic device. For example, the input device 104 can include a gamepad. A gamepad can include one or more controls for playing a game on the electronic device. I.e., the gamepad can include the controls required or desired to play a game that is run and/or displayed on the electronic device, as described below. Additionally or alternatively, the input device 104 can include a keyboard, a touchpad, a touch screen, a mouse, a scroll wheel, a headset (e.g., a Bluetooth headset), connections for external devices, such as controllers or joysticks, motion detectors, any other desired input or any combination thereof.

FIGS. 1A, 1B and 1C further show that the electronic device gaming system 100 can include a shelf 106. In at least one implementation, the shelf 106 can be configured to releasably attach the case 102. I.e., the shelf 106 can allow the case 102 to be removed from the input device 104. When the case 102 has been removed, the shelf 106 can act as a cover, protecting the input device 104, as described below. One of skill in the art will appreciate that the shelf 106 can be directly attached to the electronic device if the electronic device is so configured. I.e., the electronic device can be configured to receive the shelf 106 directly.

Figure 2:
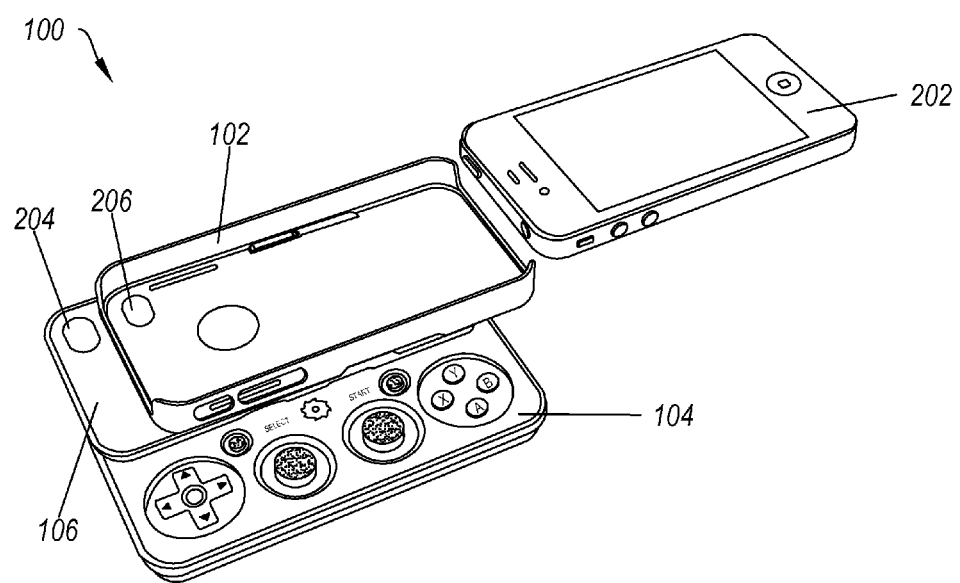
FIG. 2 illustrates an example of the electronic device gaming system in an open position.

FIG. 2 illustrates an example of the electronic device gaming system 100 in an open position. In at least one implementation, the input device 104 can move relative to the case 102. I.e., the user can place the input device 104 in a position that is parallel to the case 102 such that the input device 104 is both protected and hidden. The user can then slide the input device 104 relative to the case 102, exposing the controls.

FIG. 2 shows that the electronic device gaming system 100 can be configured to receive an electronic device 202. In at least one implementation, the electronic device 202 can be placed in the case 102. I.e., the case 102 can releasably retain the electronic device 202. The electronic device 202 can include any desired device. For example, the electronic device 202 can include a mobile phone, tablet, iPhone, Android phone, laptop or any other desired electronic device.

FIG. 2 also shows that the shelf 106 can be slidably attached to the input device 104. I.e., the shelf 106 can move relative to the input device 104 and vice versa. For example, the shelf 106 can allow the input device 104 to be slid out for play when the electronic device 202 is in the case 102 or otherwise located proximately to the input device 104. In at least one implementation, the input device 104 can include a lock button. In at least one implementation, the lock button can lock the position of the input device 104 relative to the shelf 106. For example, the lock button may engage when the input device 104 is in a particular position relative to the shelf 106. The user may then need to release the lock button to allow movement. One of skill in the art will appreciate that the input device 104 can be slidably attached directly to the electronic device 202 if the electronic device 202 is so configured. I.e., the electronic device 202 can be configured to receive the input device 104 directly without the presence of a shelf and/or case. One of skill in the art will further appreciate that the input device 104 can be slidably attached directly to the case 102 if the case 102 is so configured. I.e., the case 102 can be configured to receive the input device 104 directly without the presence of a shelf.

FIG. 2 additionally shows that the shelf 106 can include an opening 204. In at least one implementation, the opening 204 can allow a camera or other mechanism on the electronic device 202 to be used when desired. In particular, the opening 204 can be configured to match the size and shape of the electronic device 202. I.e., the opening 204 can be placed to ensure the desired access to the electronic device 202.

FIG. 2 moreover shows that the case 102 can include a second opening 206. In at least one implementation, the second opening 206 can be configured to be placed parallel to the opening 204 in the shelf 106 when the case 102 is attached to the shelf 106. I.e., the second opening 206 and the opening 204 can be placed to preserve access when the case 102 is attached to the shelf 106.

Figure 3:
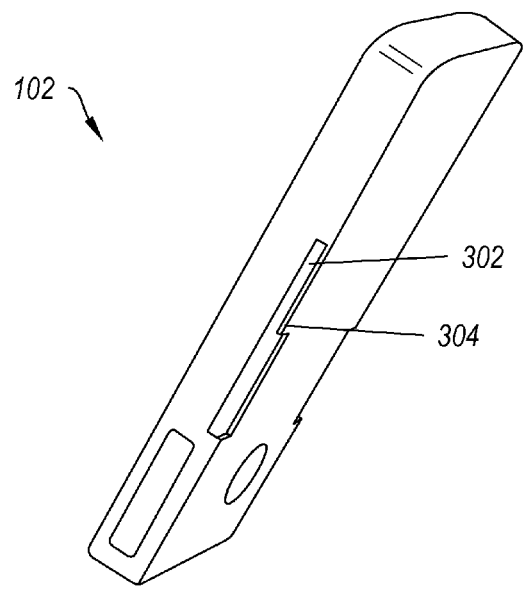
FIG. 3 illustrates an example of a case.

FIG. 3 illustrates an example of a case 102. In at least one implementation, the case 102 is configured to secure an electronic device. In particular, the case 102 can secure the electronic device relative to a gamepad. Additionally or alternatively, the case 102 can protect the electronic device. I.e., the case 102 can provide resistance to scratches or impacts.

FIG. 3 shows that the case 102 can include a channel 302. In at least one implementation, the channel is configured to slidably receive a portion of a shelf. In particular, the channel 302 can receive a protrusion which is then slid into place, securing the shelf to the case 102.

FIG. 3 also shows that the case 102 can include a lip 304. In at least one implementation, the lip 304 can include a narrowing of the channel 302. I.e., the lip 304 can include an area of the channel 302 which is smaller than an alternative portion of the channel. The lip 304 can be configured to allow the protrusion on the shelf to attach to be releasably secured to the case 102. I.e., the protrusion on the shelf will slide over the lip 304, securing the shelf to the case 102.

Figure 4:
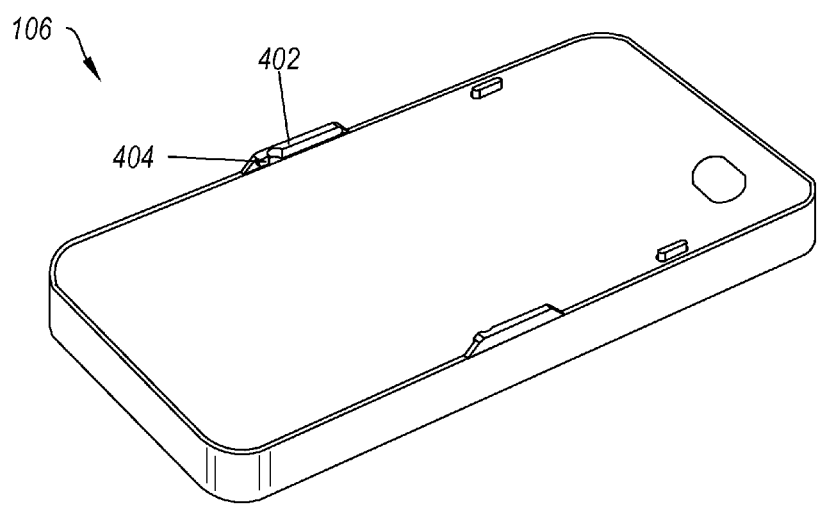
FIG. 4 illustrates an example of a shelf.

FIG. 4 illustrates an example of a shelf 106. In at least one implementation, the shelf 106 can allow movement of a gamepad relative to a phone case. That is, the shelf 106 can allow a case and gamepad to be connected to one another and to move relative to one another.

FIG. 4 shows that the shelf 106 can include a protrusion 402. In at least one implementation, the protrusion 402 is configured to be inserted into a channel 302 on a case. In particular, the protrusion 402 can be inserted into a channel 302 on a case then secured to the case 102, allowing the shelf 106 to be attached to the case.

FIG. 4 also shows that the protrusion 402 can include a groove 404. In at least one implementation, the groove 404 can be slid over a lip on a case. In particular, as the groove 404 can fit over the lip, preventing movement of the shelf 106 relative to the case. I.e., the groove 404 has very little lateral clearance relative to the lip, meaning that that shelf 402 is permitted to move only small amounts laterally relative to the case.

Figure 5:
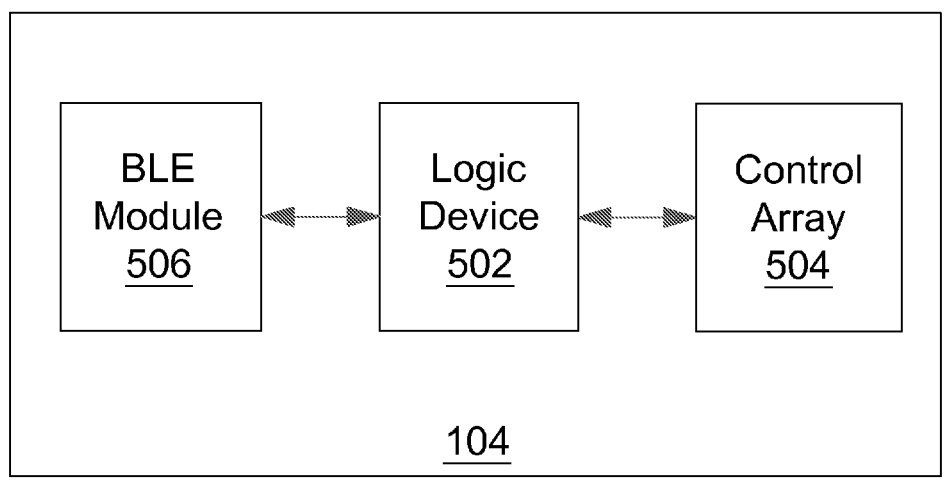
FIG. 5 illustrates a block diagram of a gamepad.

FIG. 5 illustrates a block diagram of a gamepad 500. In at least one implementation, the gamepad 500 is configured to connect to an external electronic device for gaming. For example, the gamepad 500 is one example of an input device 104 that can be used with the electronic device gaming system 100 of FIG. 1. In particular, the gamepad 500 can allow a user to control one or more elements of a game which is being run and/or displayed on the electronic device.

FIG. 5 shows that the gamepad 500 can include a logic device 502. In at least one implementation, a logic device 502 can include any device capable of performing logic functions. For example, the logic device 502 can perform Boolean logic or can produce a pre-determined output based on input. The logic device 502 can include ROM memory, programmable logic device (PLD), programmable array logic (PAL), generic array logic (GAL), complex programmable logic device (CPLD), field programmable gate arrays (FPGA), logic gates, processors or any other device capable of performing logic functions.

In at least one implementation, the logic device 502 can control the functions of the other components of the gamepad 500. In particular, the logic device 502 can ensure that the components of the gamepad 500 perform their desired function at the appropriate time and in the appropriate manner. The timing of functions can be critical to ensure that the electronic device is in communication with the gamepad 500 and that the gamepad 500 provides data as quickly as possible to the electronic device.

In at least one implementation, the logic device 502 can free the processor or controller of the electronic device to perform other tasks. Additionally or alternatively, the logic device 502 can ensure that enough resources are available to the gamepad 500 to reduce or eliminate lag time for commands. In particular, the logic device 502 can be used for processing commands input from a user and communicating the commands to the electronic device.

For example, the logic device 502 can include a microcontroller. In at least one implementation, a microcontroller (sometimes abbreviated µC, uC or MCU) is a small computer on a single integrated circuit containing a processor core, memory, and programmable input/output peripherals. Program memory in the form of NOR flash or one time programmable ROM is also often included on chip, as well as a typically small amount of RAM. Microcontrollers will generally have the ability to retain functionality while waiting for an event such as a button press or other interrupt; power consumption while sleeping (CPU clock and most peripherals off) may be just nanowatts, making many of them well suited for long lasting battery applications.

FIG. 5 also shows that the gamepad 500 can include a control array 504. In at least one implementation, the control array 504 can include a set of buttons or other controls that allow a user to input commands. For example, the control array can include direction pads, analog sticks, buttons, touch screens or any other desired input, as described below.

FIG. 5 further shows that the gamepad 500 can include a Bluetooth low energy ("BLE") module 506. In at least one implementation, the BLE module 506 can allow the gamepad 500 to connect to an electronic device. Bluetooth is a open wireless technology standard for exchanging data over short distances (using short-wavelength radio transmissions in the ISM band from 2400-2480 MHz) from fixed and mobile devices, creating personal area networks (PANs) with high levels of security. I.e., the BLE module 506 allows commands to be sent from the gamepad 500 to the electronic device and vice versa.

Figure 6:
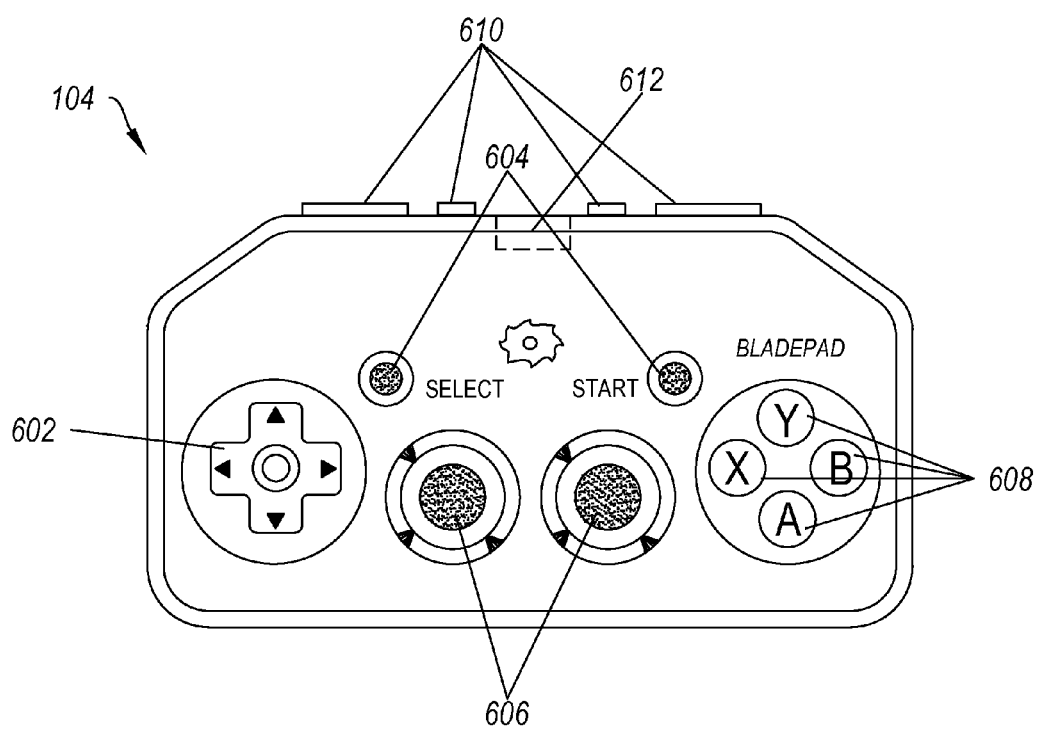
FIG. 6 illustrates an example of a gamepad.

FIG. 6 illustrates an example of a gamepad 500. In at least one implementation, the gamepad 500 can be used to control a game on an electronic device. In particular, the gamepad 500 can connect wirelessly to the electronic device to convert input from the user into a command on the electronic device.

FIG. 6 shows that the gamepad 500 can include a direction pad ("D-pad") 602. In at least one implementation, the D-pad 602 can include a flat, usually thumb-operated directional control with one button on each point. In particular, only the directions provided on the D-pad 602 buttons can be used, with no intermediate values. However, combinations of two directions (up and left, for example) can provide diagonals and the D-pad 602 can be used to provide eight-directional input if appropriate.

FIG. 6 also shows that the gamepad 500 can include menu buttons 604. In at least one implementation, the menu buttons 604 can allow a user to select among menu items in the electronic device. In particular, the menu buttons 604 are configured to allow a user to select menu options, rather than perform in-game commands. For example, the menu buttons 604 can include a "select" button, a "start" button, a "mode" button, a "home" button or any other desired button.

FIG. 6 further shows that the gamepad 500 can include a set of analog sticks 606. In at least one implementation, the set of analog sticks 606, sometimes called a control stick or thumbstick, is an input device that is used for two-dimensional input. An analog stick 606 is a variation of a joystick, consisting of a protrusion from the gamepad 500; input is based on the position of this protrusion in relation to the default "center" position. For example, the set of analog sticks 606 can use continuous electrical activity running through potentiometers to determine their current position.

In at least one implementation, a potentiometer, informally, a pot, in electronics technology is a component, a three-terminal resistor with a sliding contact that forms an adjustable voltage divider. I.e., as the analog stick 606 moves the sliding contact is moved along the resistor. The measurement resistance measures the position of the analog stick 606 along the axis of the potentiometer. A second potentiometer perpendicular to the first potentiometer allows for position measurement in a Cartesian coordinate system.

FIG. 6 additionally shows that the gamepad 500 can include one or more action buttons 608. In at least one implementation, the action buttons 608 can allow a user to perform a desired action within a game. I.e., the action buttons 608 are tied to a specific action within the game. One of skill in the art will appreciate that more than one action button 608 may perform a single action, a particular action button may remain unused in a game, combinations may be used to perform the desired action or any other desired configuration of action button can be used to perform a desired action.

FIG. 6 moreover shows that the gamepad 500 can include one or more shoulder buttons 610. In at least one implementation, the shoulder buttons 610 can be positioned along the rear edge (from a standard holding position). The shoulder buttons 610 can allow a user to input additional commands related to a particular action. I.e., the shoulder buttons 610, or combinations thereof, can be linked to particular actions as with the actions buttons 608.

FIG. 6 also shows that the gamepad 500 can include a connection port 612. In at least one implementation, the connection port 612 can allow the gamepad 500 to connect to an external device. For example, the connection port 612 can allow the gamepad 500 to be connected to a computer to allow software within the gamepad 500 to be updated. Additionally or alternatively, the connection port 612 can be used to supply power to the gamepad 500. For example, the connection port 612 can include a USB port or other desired connection.

Figure 7:
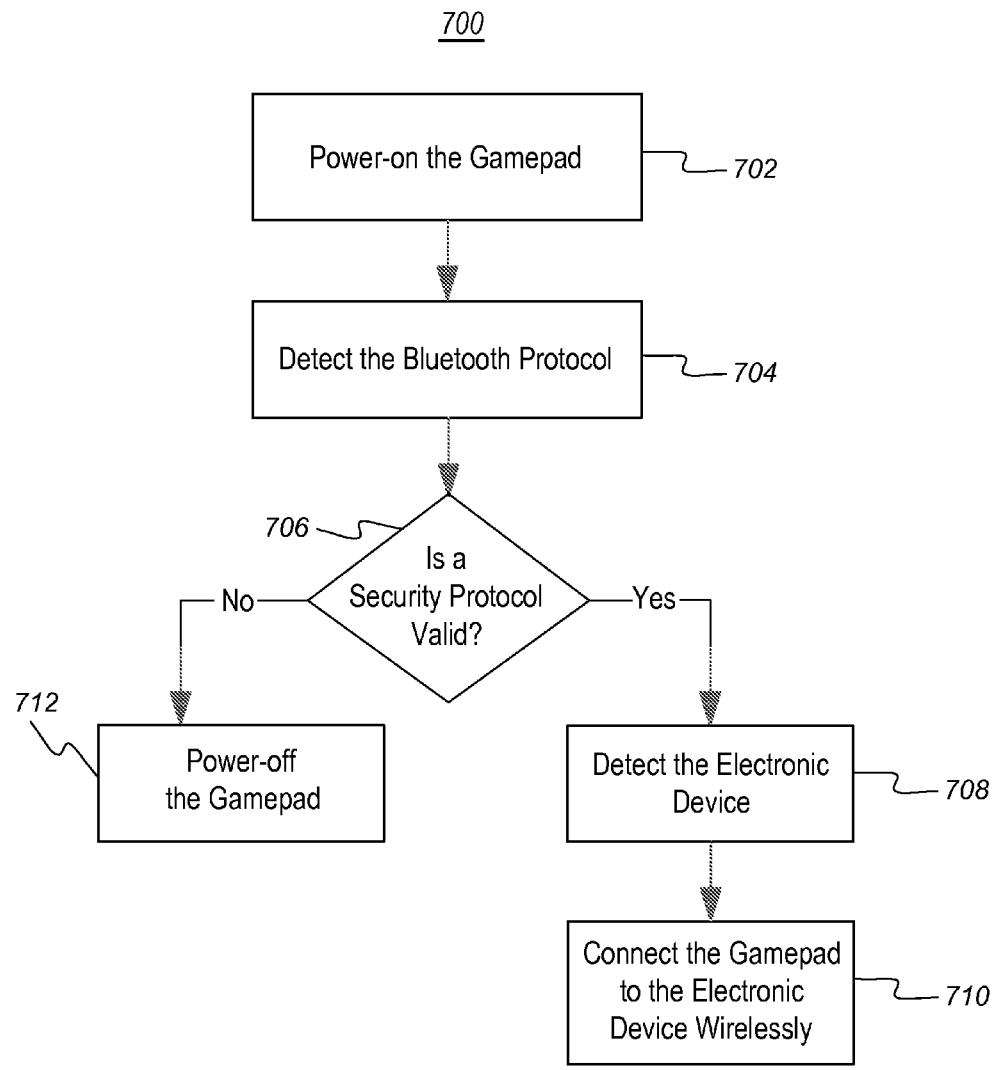
FIG. 7 is a flowchart illustrating an example of a method for connecting an electronic device to a gamepad.

FIG. 7 is a flowchart illustrating an example of a method 700 for connecting an electronic device to a gamepad. In at least one implementation, the game pad can be the gamepad 500 of FIG. 1. Therefore, the method 700 will be described, exemplarily, with reference to the gamepad 500 of FIG. 1. Nevertheless, one of skill in the art can appreciate that the method 700 can be used with a gamepad other than the gamepad 500 of FIG. 1.

FIG. 7 shows that the method 700 can include powering-on 702 the gamepad. In at least one implementation, powering-on 702 the gamepad can include any action which indicates that the user intends to use the gamepad. For example, powering-on 702 the gamepad can include the user sliding the gamepad to an open position. That is, the gamepad can be slid out from a shelf or other closed position to an open or active position which automatically powers-on 702 the gamepad. Additionally or alternatively, powering-on 702 the gamepad can include the user activating a power button or switch.

FIG. 7 also shows that the method 700 can include detecting 704 the Bluetooth protocol. In at least one implementation, the Bluetooth protocol allows the gamepad and the electronic device to communicate with one another wirelessly. Such a connection allows the gamepad and/or the electronic device to be positioned relative to one another as desired by the user. I.e., the gamepad can be positioned by the user in a desired location relative to the electronic device. Additionally or alternatively, a wireless connection can allow the gamepad and/or the electronic device to be connected to a power source while communicating with one another. I.e., data ports can be used for power supply purposes, rather than data exchange purposes.

FIG. 7 further shows that the method 700 can include determining 706 whether the security protocol is valid. In at least one implementation, a valid security protocol allows desired devices to connect to the electronic device while preventing undesired connections. For example, the security protocol can ensure that the gamepad does not access files or perform functions that are not desired based on the nature of the gamepad.

FIG. 7 additionally shows that the method 700 can include detecting 708 the electronic device if the security protocol is valid. In at least one implementation, detecting 708 the electronic device can include exchanging identifying information between the gamepad and the electronic device. In particular, detecting 708 the electronic device can include identifying previously connected electronic devices and/or electronic devices that are within communication range.

FIG. 7 moreover shows that the method 700 can include connecting 710 the gamepad to the electronic device wirelessly. In at least one implementation, connecting 710 the gamepad to the electronic device wirelessly can include the gamepad and the electronic device sending signals to one another. For example, the gamepad can send control signals that are produced when a user pushes a button, moves an analog stick or performs some other action.

FIG. 7 also shows that the method 700 can include powering-off 712 the gamepad if the security protocol is not approved. In at least one implementation, powering-off 702 the gamepad can preserve the battery or other power source of the gamepad if the gamepad is unavailable for use. I.e., since the gamepad cannot connect to an electronic device the battery or other power source can be preserved until the problems with the security protocol can be resolved.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 8:
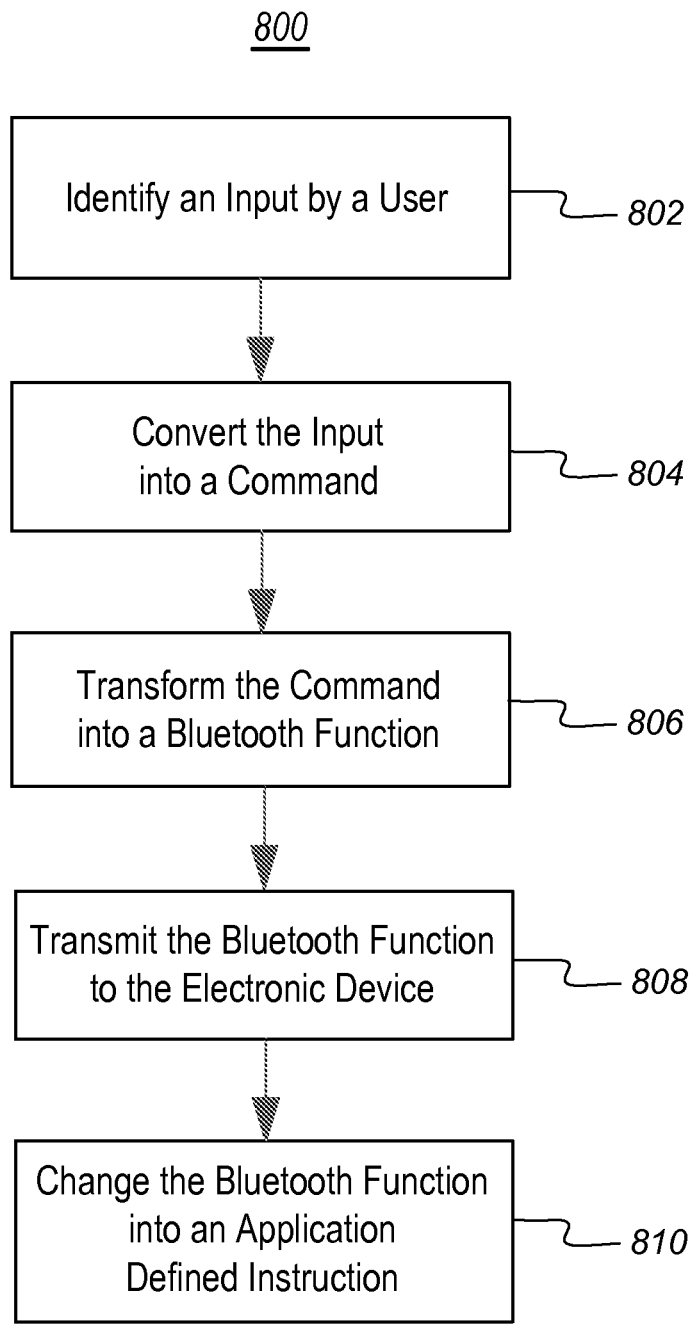
FIG. 8 is a flowchart illustrating a method of electronic communication between a gamepad and an electronic device.

FIG. 8 is a flowchart illustrating a method 800 of electronic communication between a gamepad and an electronic device. In at least one implementation, the method can allow a user to implement controls in a desired application. That is, the user can use a single gamepad with inputs converted into application defined instructions which may vary from application to application.

FIG. 8 shows that the method 800 can include identifying 802 an input from a user. I.e., a user inputs a command which is identified 802 by the gamepad. For example, the gamepad can identify a button push, a directional command on a directional pad, movement of an analog stick or any other command input.

FIG. 8 also shows that the method 800 can include converting 804 the input into a command. In at least one implementation, the command can be the same regardless of the game being played or the electronic device. I.e., the command can be converted 804 into machine code that is the same each time the particular input is identified 802. The input can be converted 804 to a command by a logic device or other device.

FIG. 8 further shows that the method 800 can include transforming 806 the command into a Bluetooth function. In at least one implementation, the Bluetooth function includes data that is configured to be transmitted to the electronic device. The command can be transformed 806 into a Bluetooth function by a logic device, BLE module or some other device. One of skill in the art will appreciate that converting 804 the input into a command and transforming 806 the command into a Bluetooth function can include a single step. That is, the input can be identified 802 and transformed into a Bluetooth function without any intermediate steps such as converting 804 the input into a command.

FIG. 8 additionally shows that the method 800 can include transmitting 808 the Bluetooth function to the electronic device. In at least one implementation, the Bluetooth function can be transmitted 808 wirelessly to the electronic device. In particular, the Bluetooth function can be transmitted 808 by a BLE module or similar wireless device. Likewise, the Bluetooth function can be received by a Bluetooth module or similar device in the electronic device.

FIG. 8 moreover shows that the method 800 can include changing 810 the Bluetooth function into an application defined instruction. In at least one implementation, the application defined instruction can include commands or inputs recognized by the application. I.e., the Bluetooth function can remain the same for each input, but be changed 810 into the desired instruction within the application. For example, a movement of the analog stick may move a character in one application but change a viewing direction in another application.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A electronic device gaming electronic device gaming system, the electronic device gaming electronic device gaming system comprising:
    a case configured to receive an electronic device;
    a shelf releasably attached to the case; and
    a gamepad:
        slidably attached to the shelf;
        configured to connect wirelessly to the electronic device; and
        including one or more controls.

2. The electronic device gaming system of claim 1, wherein the electronic device includes a mobile phone.

3. The electronic device gaming system of claim 1, wherein the electronic device includes an IPHONE.

4. The electronic device gaming system of claim 1, wherein the electronic device includes a tablet.

5. The electronic device gaming system of claim 1, wherein the input device includes a gamepad which includes one or more controls.

6. The electronic device gaming system of claim 5, wherein the one or more controls includes a directional pad.

7. The electronic device gaming system of claim 5, wherein the one or more controls includes a button.

8. The electronic device gaming system of claim 5, wherein the one or more controls includes an analog stick.

9. The electronic device gaming system of claim 1, wherein the gamepad is configured to move relative to the case.

10. The electronic device gaming system of claim 1 further comprising a lock button configured to lock the position of the gamepad relative to the shelf.

11. The electronic device gaming system of claim 1, wherein the case includes an opening, wherein the opening is configured to allow a user to access a camera on the electronic device.

12. The electronic device gaming system of claim 11, wherein the shelf includes an opening, wherein the opening is configured to allow a user to access a camera on the electronic device.

13. The electronic device gaming system of claim 1 further comprising a connection port.

14. A electronic device gaming electronic device gaming system, the electronic device gaming electronic device gaming system comprising:
    a case configured to receive an electronic device and including:
        a channel; and
        a lip protruding into the channel;
    a shelf including:
        a protrusion, wherein the protrusion is configured to be placed in the channel and slid over the lip, releasably attaching the shelf to the case; and
    a gamepad:
        slidably attached to the shelf;
        configured to connect wirelessly to the electronic device; and
        including one or more controls.

15. The electronic device gaming system of claim 14, wherein the protrusion includes a groove, wherein the groove is configured to be slid over the lip.

16. The electronic device gaming system of claim 14, wherein the gamepad further includes a logic device.

17. The electronic device gaming system of claim 16, wherein the logic device includes a processor.

18. The electronic device gaming system of claim 16, wherein the logic device includes a microcontroller.

19. The electronic device gaming system of claim 14, wherein the gamepad further includes a BLUETOOTH low energy module.

* * * * *